No. 830,684. PATENTED SEPT. 11, 1906.
E. P. STARBIRD.
APPARATUS FOR SEPARATING LIQUIDS FROM SOLIDS.
APPLICATION FILED FEB. 11, 1904.
2 SHEETS—SHEET 1.
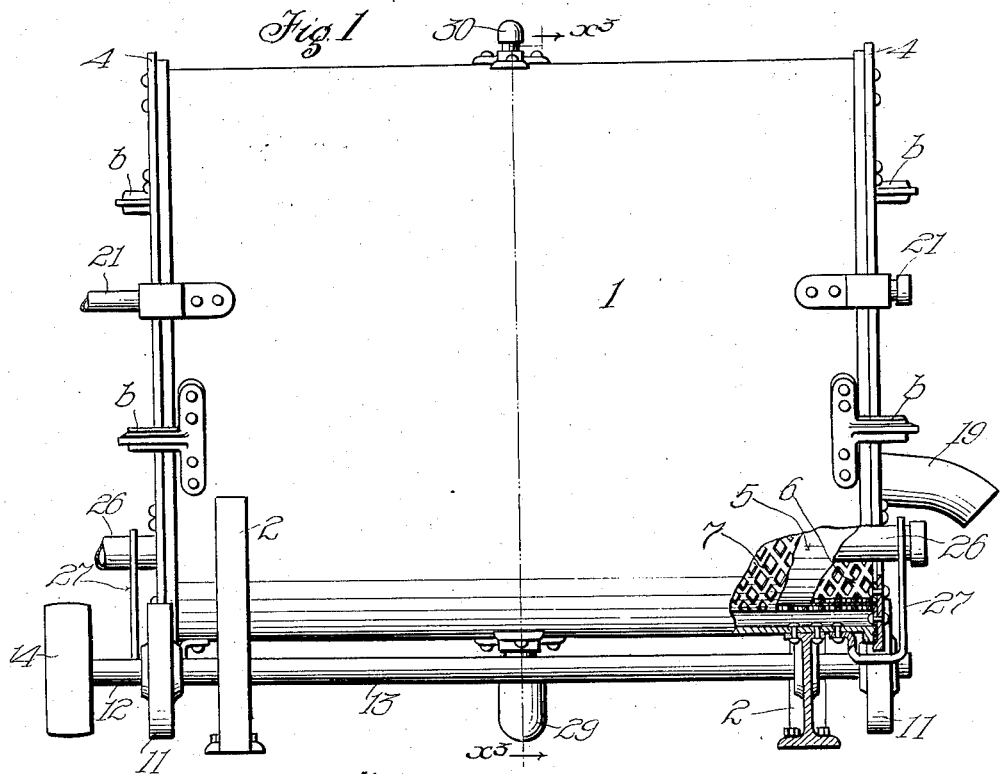
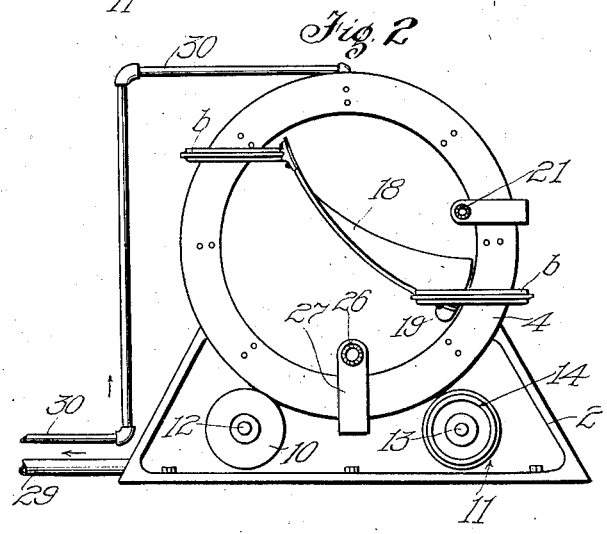
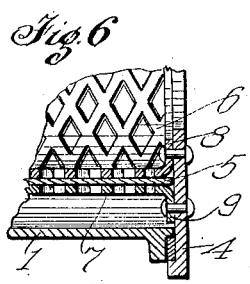
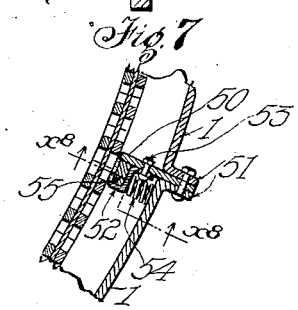
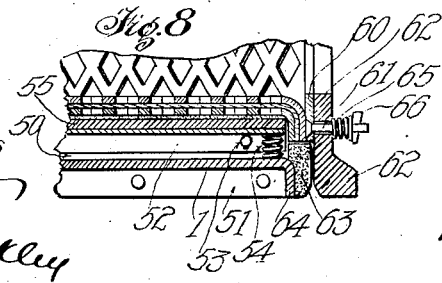
Witnesses
Inventor
Edwin P. Starbird
by Townsend Bros.
his attys No. 830,684. PATENTED SEPT. 11, 1906.
E. P. STARBIRD.
APPARATUS FOR SEPARATING LIQUIDS FROM SOLIDS.
APPLICATION FILED FEB. 11, 1904.
2 SHEETS—SHEET 2.
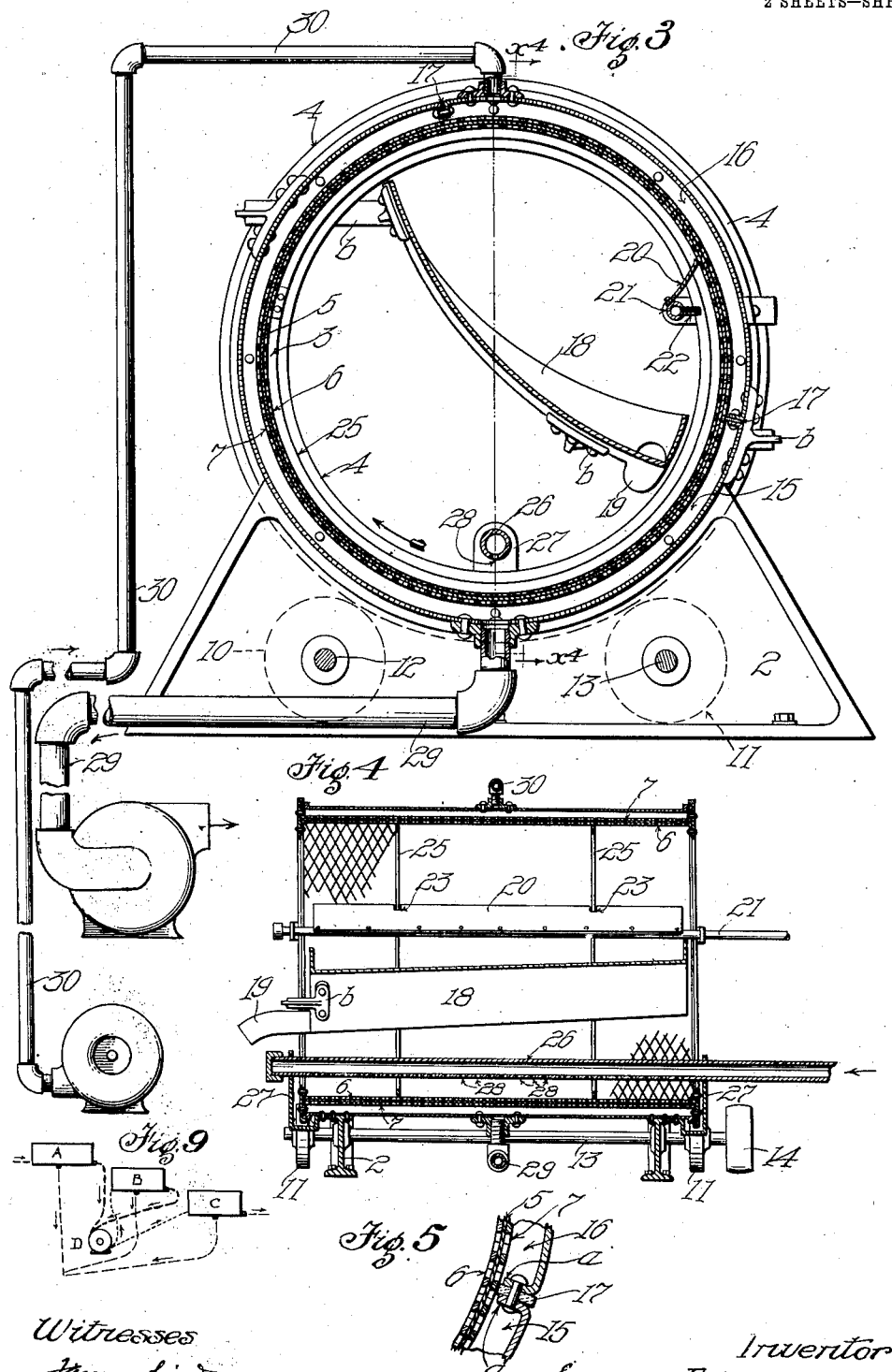
Witnesses
Inventor
Edwin P. Starbird
by Townsend Bros.
his attys

UNITED STATES PATENT OFFICE.

EDWIN P. STARBIRD, OF VICTORVILLE, CALIFORNIA.

APPARATUS FOR SEPARATING LIQUIDS FROM SOLIDS.

No. 830,684.

Specification of Letters Patent.

Patented Sept. 11, 1906.

Application filed February 11, 1904. Serial No. 193,061.

*To all whom it may concern:*

Be it known that I, EDWIN P. STARBIRD, a citizen of the United States, residing at Victorville, in the county of San Bernardino and State of California, have invented a new and useful Apparatus for Separating Liquids From Solids, of which the following is a specification.

This apparatus is particularly adapted for carrying out the process set forth in another application of mine, filed January 18, 1904, Serial No. 189,469, the process having especial value in metallurgical processes in the separation of slimes or pulp from solution.

One of the main features of the present invention is that the construction provides for a continuous operation. Where tailings are being treated, the slimes or pulp may be fed continuously into the apparatus and the water will be discharged at one point and the residuum discharged at another point.

The process which the apparatus performs in brief is the introduction of pulp or slimes to a movable filter through which a suction is maintained which causes the mixture to hug the filter, the liquid being drawn through the filter by the suction, while the solids are carried bodily with the filter past the suction-point, whereupon the solids are freed from the filter.

By referring to "pulp" I mean the product of wet crushing or the product of dry crushing which has been wet up. The term "dried pulp" is used in its relative sense and as contrasting the condition of the pulp with its condition in some other stage of the treatment.

The accompanying drawings illustrate the invention, and, referring to the same, Figure 1 is a side elevation of the apparatus with a part of the outer shell broken away, part of the outer foraminated shell of the revoluble barrel being also removed. Fig. 2 is an end elevation of the apparatus. Fig. 3 is a section on line $X^3 X^3$, Fig. 1. Fig. 4 is a section on line $X^4 X^4$, Fig. 3. Fig. 5 is a sectional detail of a portion, showing the packing which separates the suction-chamber from the compression-chamber. Fig. 6 is a sectional detail of a portion, showing the device for sealing the joint between the revoluble barrel and the outer stationary shell. Fig. 7 is a fragmental detail showing another form of packing between suction and compression chambers. Fig. 8 is a fragmental detail taken in section on line $X^8 X^8$, Fig. 7. Fig. 9 is a diagrammatical view showing system of treatment by successive steps in apparatuses in terrace arrangement and relation of reagitation to the steps.

1 designates an outer stationary cylindrical shell which is mounted upon standards 2. Within the outer shell 1 is a revoluble filter 3, mounted to revolve concentrically within the shell 1, being provided with flanges 4, which consist of annular rings, as shown, riveted or otherwise secured to its edge.

The filter 3 may comprise a permeable material 5, which lies between inner and outer perforated shells 6 and 7, respectively. Each edge of the inner shell 6 may have an inturned flange 8, while the outer shell 7 may have an outturned flange 9, and the annular rings or bearing-flanges 4 may be riveted or bolted to the flanges 8 and 9, as shown in Fig. 6. Said filter 3 is revoluble in a vertical plane and is preferably open at each end, so that the materials operated on may be readily fed to and delivered from the interior thereof. The stationary shell 1 extends completely around the filter, forming a smooth and continuous guide in which said filter rotates, being at a sufficient distance from the filter to provide an annular space in which are formed chambers hereinafter described.

The filter is supported and driven by two pairs of rolls 10 and 11, the flanges 4 resting upon the peripheries of the rolls, as shown. The rolls 10 are carried by a shaft 12, and the rolls 11 are carried by a shaft 13, both shafts being journaled in the standards 2, and one of the shafts may carry a driving-pulley 14.

The diameter of the filter is somewhat less than the outer stationary shell, so that an annular space is formed, and this space is divided into a segmental suction-chamber 15 and a segmental compression-chamber 16 by means of strips of packing 17, which are arranged longitudinally of the shell, being supported on the outer shell between inturned longitudinal flanges $a$, which are bolted together, as shown in detail in Fig. 5.

An inclined delivery-trough 18 is arranged within the filter and is supported by arms $b$, which are bolted or riveted to the outer shell and which curve around the flanges of the revoluble filter, so as to freely clear the same.

The trough 18 is inclined horizontally and also laterally, as shown in Figs. 2 and 3, and so arranged as to extend under the area embraced by the compression-chamber and is adapted to receive the dried pulp as it falls from the filter when brought over the compression area. The lower end of the trough 18 has a spout 19, through which the dried pulp is discharged.

A scraper 20 extends longitudinally of the filter and bears against the inner face thereof, being supported by a pipe 21, the latter being provided with a series of jet-nozzles 22, which point toward the inner face of the filter and are arranged below the scraper 20, and water under pressure may be supplied to the pipe 21 and will be discharged against the inner face of the filter to loosen up any pulp which may adhere to the filter after passing the scraper 20.

The scraper 20 is notched, as at 23, (see Fig. 4,) to provide for the free passage of ribs 25, which are arranged internally of the filter to strengthen the same.

26 is a feed-pipe which is supported by arms 27, bolted or otherwise fastened to the outer shell 1, and the feed-pipe 26 extends longitudinally through the space in the filter, being located a trifle above the inner periphery of the flanges 4. Along its under side the feed-pipe 26 is provided with discharge-orifices 28, through which the pulp to be treated percolates and drops onto the revolving filter.

29 is a suction-pipe which communicates with the suction-chamber 15, preferably at the lowest part of the outer shell 1. The other end of the suction-pipe 29 is connected to a suitable pump, as shown.

30 is a pipe for conveying air under pressure to the compression-chamber 16, the pipe communicating, preferably, as shown, at the upper point of the compression-chamber, its other end being connected to a suitable air-pump or compressor, as shown.

In operation the filter is revolved through the medium of the rolls 11, and suction is maintained within the suction-chamber 15 while compression is maintained within the compression-chamber 16. The slimes or pulp is fed through the feed-pipe 26 and percolates through the orifices 28, dropping onto the revolving filter, and the suction within the suction-chamber 15 causes the mixture to adhere to the moving filter, while the water in the mixture is sucked through the filter into the compression-chamber, from whence it is drawn away through the suction-pipe 29.

On account of the suction within the chamber 15 the solids of the mixture hug the revolving filter and are thereby carried up and around into the area embraced by the compression-chamber, and as soon as the pulp passes the first strip of packing 17, located at the upper part of the apparatus, the pressure of air maintained within the compression-chamber loosens the pulp from the filter and it drops onto the trough 18. A considerable area is embraced by the compression-chamber, so that ample provision is made for the complete removal of the dry pulp from the revolving filter; but in order to insure a thorough cleaning of the filter from any pulp which may adhere to the filter in spite of the air-pressure the scraper 20 is employed, so that any pulp which remains on the filter is removed by the scraper and falls onto the trough 1, and the jets of water which issue from the water-pipe 21 further clean the filter and prevent the clogging of the same by any incrustation, so that the filter is perfectly clean from any matter when entering the suction-chamber. As the pulp drops onto the revolving filter continuously, a layer of pulp is maintained on the inside of the filter, which in passing through the suction-chamber is robbed of the greater part of its liquid, so that by the time of reaching the compression zone the pulp is practically free from moisture. If the pulp is given a preliminary treatment in a settling-tank or other device before being introduced to this apparatus to remove the greater part of the liquid before being operated upon by the apparatus, the amount of liquid to be removed will be less.

If desired, the pulp after having been passed through the apparatus may be reagitated again with more solution and passed through a duplicate apparatus to accomplish a further separation and removal of values, the apparatuses being in terrace arrangement, as shown in Fig. 9, and the process may be continued through successive stages of suction treatment interspersed with agitation, so that the solution gradually becomes weaker as the steps progress and the ultimate removal of the values is attained.

In Fig. 9, A, B, and C indicate three apparatuses arranged on different levels. D indicates an agitator. The heavy dotted lines indicate the return of the pulp to the agitator from apparatuses A and B. The light dotted lines indicate the passage of the pulp after reagitation to the apparatuses B and C. The dash-line indicates the solution removed from apparatuses A, B, and C.

Instead of giving the revoluble barrel a continuous revolution in one direction it may be oscillated and practically the same result secured, and it is obvious that a segmental filter or pulp-carrier could be employed instead of the cylindrical one shown and either oscillated or swung in a circle—i. e., revolved. Furthermore, the mixture may be admitted intermittently through the feed-pipe, which would qualify in terms, but not in substantial effect, the result produced by the continuous operation of the device.

The reagitation of pulp and duplicate steps may be employed at discretion, and the character of the material being treated will largely determine the course to be pursued.

Fig. 7 shows a longitudinal strip 50 bolted between outturned flanges 51 in the outer shell 1. The strip 50 supports a Z-bar 52 by means of bolts 53, which pass through elongated slots in the Z-bar, and the Z-bar is resiliently pressed toward the filter 3 by springs 54. Packing 55, supported by the Z-bar, is held tight against the outer casing 7 of the filter.

According to the modification shown in Fig. 8, which harmonizes with the modification shown in Fig. 7, an annular ring 60 is riveted to the flanged ends of the filter. This ring supports studs 61, which loosely pass through rings 62, corresponding to the flanges 4. A packing-ring 63 lies between the ring 62 and a flange 64, turned out from the end of the shell 1. The rings 62 are resiliently pressed toward the ends of the filter by coil-springs 65, supported on the stud 61 and held in place by keys 66. This keeps the packing-rings 63 in close fit with the rings 62.

While I have shown and described the preferred embodiment of my invention, it should be understood that various changes may be made in the specific construction shown without in any way departing from the spirit of the invention and scope of the claims.

What I claim is—

1. A shell, a cylindrical filter within the shell and forming an annular space between the cylinder and shell, partitions dividing the annular space into a plurality of closed chambers, means for maintaining a suction in one chamber, and a conduit for supplying atmospheric pressure in another chamber.

2. A stationary shell, a revoluble filter within said shell of less diameter than the shell, means for maintaining a suction within one portion of the space between the filter and shell, and means for maintaining atmospheric pressure within another portion of said space.

3. A cylindrical filter revoluble in a vertical plane, a feed discharging inside of said filter, means for causing a suction at the outer lower portion of said cylinder, means for causing atmospheric pressure at the outer upper portion of said cylinder, and a delivery within the cylinder and adapted to receive material from the upper portion thereof.

4. A revoluble cylindrical filter, a stationary shell fitting around the outside of said filter, said shell being furnished with a pressure-chamber and a suction-chamber, said chambers inclosing different portions of the periphery of said cylinder, means for withdrawing air from said suction-chamber, means for forcing air into said pressure-chamber, a feed discharging into the cylinder, and a delivery-spout adapted to deliver material from the portion of the inside of the cylinder opposite the pressure-chamber.

5. A cylindrical filter revoluble in a vertical plane and having an open end, a delivery leading from said filter extending through said open end, a feed adapted to supply material to the interior of the cylinder at the lower portion thereof, a shell forming a suction-chamber adapted to hold the ascending material to the side of the cylinder, and means for withdrawing air from said suction-chamber.

6. A cylindrical filter revoluble in a vertical plane and having an open end, a delivery leading from said filter extending through said open end, a feed adapted to supply material to the interior of the cylinder at the lower portion thereof, a shell forming a suction-chamber adapted to hold the ascending material to the side of the cylinder, means for withdrawing air from said suction-chamber, and a scraper adapted to remove the descending material from the side of the cylinder.

7. A revoluble filter, a stationary shell extending completely around the periphery of said filter and forming a suction-chamber on one side thereof, means for producing a suction in said chamber, and means for rotating the filter.

8. A revoluble filter, a stationary shell extending completely around the periphery of said filter and forming two chambers at different parts of the circumference thereof, one of said chambers being a suction-chamber and the other a pressure-chamber, means for producing a suction in the suction-chamber, and means for producing atmospheric pressure in the pressure-chamber.

9. A filter, a stationary shell inclosing the filter, means for applying a suction over a certain area of the space between the shell and filter, a stationary scraper bearing against the filter, means for moving the filter across the suction area and scraper, and means for projecting a solvent against the filter adjacent to and below the scraper.

10. A filter, a stationary shell inclosing the filter, means for applying a suction over a certain area of the space between the shell and filter, a stationary scraper bearing against the filter, means for moving the filter, and a pipe having orifices fronting the filter and near to and below the scraper.

11. A revoluble, cylindrical filter, a stationary shell extending completely around the cylinder at a distance from its periphery, means for closing the space between said filter and shell at each end thereof, means for dividing the circumferential extent of said space into two chambers, means for producing a suction in one of said chambers, and means for producing atmospheric pressure in the other chamber.

12. A stationary shell, a cylindrical filter within the shell, flanges for inclosing the space between the cylinder and shell, means for producing a suction in part of said space, and means for producing a compression in another part of said space.

13. A stationary shell, a cylindrical revoluble filter within the shell, said shell extending completely around the periphery of the cylinder at a distance therefrom, flanges on the filter which inclose the space between the filter and shell, and means for producing a suction in the space.

14. A stationary shell, an open-ended cylindrical filter within said shell of less diameter than the interior thereof, means for closing the space at each end of said filter and shell to form a suction-chamber therebetween, and means for producing a suction in said chamber.

15. A stationary shell, an open-ended cylindrical filter within said shell of less diameter than the interior thereof, means for closing the space at each end of said filter and shell to form a suction-chamber therebetween, means for producing a suction in said chamber, and feeding means extending longitudinally through said filter and having stationary supports at each end thereof.

16. A stationary shell, a cylindrical filter within the shell comprising outer and inner perforated casings and a permeable material between the casings, and means for producing a suction in the space between the filter and shell.

17. A stationary shell, a cylindrical filter within the shell comprising outer and inner perforated casings and a permeable material between the casings, and flanges on the filter extending at least to the edges of the shell.

18. A stationary shell, a cylindrical filter within the shell comprising outer and inner perforated casings and a permeable material between the casings, flanges on the filter, and suitable packing between the flanges and shell.

19. A stationary shell, a cylindrical filter within the shell, flanges on the filter inclosing the space between the cylinder and shell, means for maintaining a suction in space between the filter and shell, means for revolving the filter, a trough extending through the cylindrical space embraced by the filter, and arms on the shell supporting the trough.

20. A stationary shell, a cylindrical filter within the shell, flanges on the filter inclosing the space between the cylinder and shell, means for maintaining a suction in space between the filter and shell, means for revolving the filter, a trough extending through the cylindrical space embraced by the filter, arms on the shell supporting the trough, a scraper bearing against the inner face of the filter, and means attached to the stationary shell for supporting the scraper.

21. A stationary shell, a cylindrical filter within the shell, flanges on the filter inclosing the space between the cylinder and shell, means for maintaining a suction in space between the filter and shell, means for revolving the filter, a trough extending through the cylindrical space embraced by the filter, arms on the shell supporting the trough, a pipe having orifices fronting the inner face of the filter, arms on the stationary shell supporting the pipe, and a scraper mounted on the pipe.

22. A stationary shell, a cylindrical filter within the shell, flanges on the filter inclosing the space between the filter and shell, means for dividing the annular space between the filter and shell into a plurality of segmental chambers, means for maintaining a suction within one of the chambers, means for maintaining a compression within another of the chambers, and a trough extending through the cylindrical space embraced by the filter.

23. A stationary shell, a cylindrical filter within the shell, flanges on the filter inclosing the space between the filter and shell, means for dividing the annular space between the filter and shell into a plurality of segmental chambers, means for maintaining a suction within one of the chambers, means for maintaining a compression within another of the chambers, a trough extending through the cylindrical space embraced by the filter, and arms on the shell supporting the trough.

24. A stationary shell, a cylindrical filter within the shell, flanges on the filter inclosing the space between the filter and shell, means for dividing the annular space between the filter and shell into a plurality of segmental chambers, means for maintaining a suction in one of the chambers, means for maintaining a compression within another of the chambers, a trough extending through the cylindrical space embraced by the filter, said trough being inclined laterally to the compression area.

25. A stationary shell, a cylindrical filter within the shell, flanges on the filter inclosing the space between the filter and shell, means for dividing the annular space between the filter and shell into a plurality of segmental chambers, means for maintaining a suction in one of the chambers, means for maintaining a compression within another of the chambers, and a trough extending through the cylindrical space embraced by the filter and also inclined longitudinally.

26. A stationary shell, a cylindrical filter within the shell, flanges on the filter inclosing the space between the filter and shell, means for dividing the annular space between the filter and shell into a plurality of segmental chambers, means for maintaining a suction within one of the chambers, means for maintaining a compression within another of the chambers, a trough extending through the cylindrical space embraced by the filter, and a feed-pipe having discharge-orifices facing the inner face of the filter.

27. Two elements comprising a cylindrical filter and a cylindrical shell, said elements being concentric and one within the other, means for producing a suction within the space between said elements, and means for rotating one of said elements In testimony whereof I have signed my name to this specification, in the presence of two subscribing witnesses, at Los Angeles, in the county of Los Angeles and State of California, this 3d day of January, 1904.

EDWIN P. STARBIRD.

Witnesses:
 GEORGE T. HACKLEY,
 FREDERICK W. LYON.